(No Model.)
J. L. HUGHES.
COTTON CHOPPER.
No. 252,221. Patented Jan. 10, 1882.
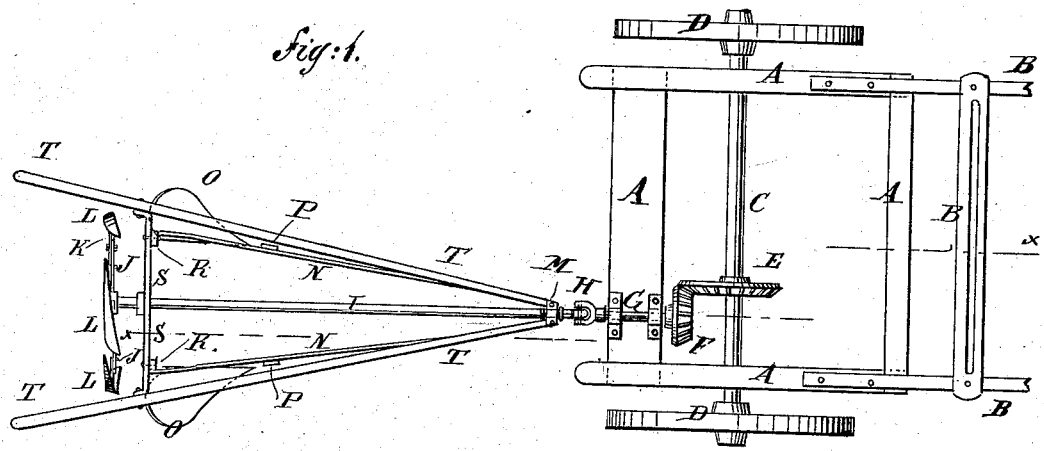
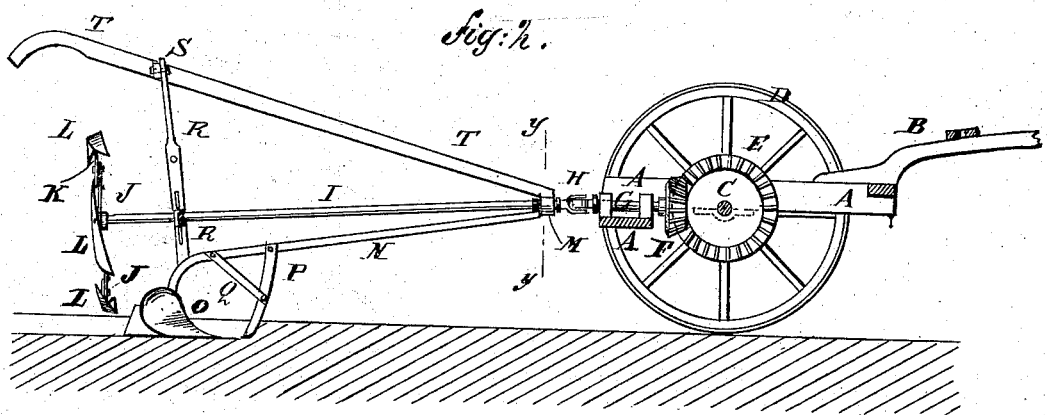
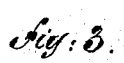
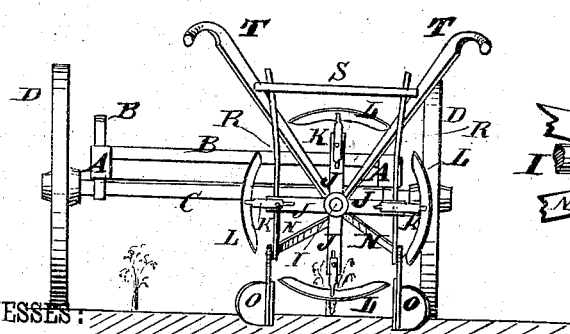
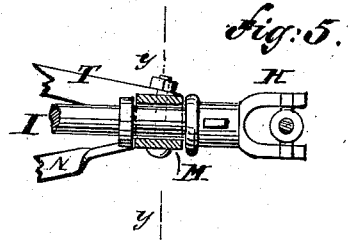
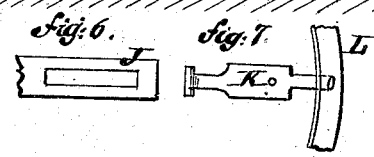
WITNESSES:
Chas. Nida
C. Sedgwick
INVENTOR:
J. L. Hughes
BY Munn & Co
ATTORNEYS.

UNITED STATES PATENT OFFICE.

JOSIAH L. HUGHES, OF CLEVELAND, TENNESSEE.

COTTON-CHOPPER.

SPECIFICATION forming part of Letters Patent No. 252,221, dated January 10, 1882.

Application filed September 3, 1881. (No model.)

*To all whom it may concern:*

Be it known that I, JOSIAH L. HUGHES, of Cleveland, in the county of Bradley and State of Tennessee, have invented certain new and useful Improvements in Cotton-Choppers, of which the following is a specification.

Reference is to be had to the accompanying drawings, forming part of this specification, in which similar letters of reference indicate corresponding parts in all the figures.

Figure 1 is a plan view of my improvement. Fig. 2 is a sectional elevation of the same, taken through the line $x\ x$, Fig. 1. Fig. 3 is a rear elevation of the same. Fig. 4 is a sectional elevation of a part of the same, taken through the line $y\ y$, Figs. 2 and 5. Fig. 5 is a sectional elevation of a part of the same, taken through the line $z\ z$, Fig. 4. Fig. 6 is a side view of the outer part of one of the radial knife carrying arms. Fig. 7 is a view of the middle part of one of the knives and its shank.

The object of this invention is to facilitate the chopping of cotton to a stand and promote convenience in guiding and controlling the choppers.

The invention consists in a cotton-chopper constructed with a carriage, gear-wheels connected with the rotary axle of the carriage, two shafts connected by a universal joint, radial arms attached to the rear shaft and carrying the chopping-knives, plows provided with colters for barring off the rows, an upright frame, the handles, and a swiveled bearing for connecting the plow-beams and handles with the shaft, whereby the chopper can be readily guided and controlled, as will be hereinafter fully described.

In the drawings, A represents the frame of the machine, to the forward end of which are attached the thills B.

In bearings attached to the side bars of the frame A revolves the axle C of the wheels D.

To the axle C, at one side of its center, is attached a beveled-gear wheel, E, the teeth of which mesh into the teeth of a beveled-gear wheel, F, attached to the forward end of the short shaft G. The shaft G revolves in bearings attached to the rear cross-bar of the frame A, and with its rear end is connected by a universal joint, H, the forward end of a shaft, I, to the rear end of which are attached the inner ends of four radial arms, J, or a hub to which the said radial arms are attached.

The outer parts of the arms J are slotted to receive the bolts that fasten the shanks K of the cutters or knives L to the said arms, so that the cutters or knives L can be adjusted to work at any desired depth in the ground, and to leave more or less of the plants as the adjustment to and from the center opens and closes the distance between the knives. The knives L are curved in about the arc of a circle having its center in the axis of the shaft I, are set at an inclination with the plane of the radial arms J, and have their forward edges sharpened, so that there will be space between the rear end of each knife and the forward end of the next knife to leave enough plants for a hill. Upon the forward part of the shaft I is placed a bearing, M, which is kept in place by two collars attached to or formed upon the said shaft I, or by other suitable means.

To the lower side of the swiveled bearing M, upon the opposite sides of the shaft I, are attached the forward ends of the plow-beams N, the rear ends of which are curved downward, and to them are attached plows O to scrape or bar off the rows of plants. The beams N are made of such a length that the plows O will be a little in front of the cutters or knives L.

To the beams N, a little in front of the plows O, are attached colters P, to cut the soil and prevent the plants from being torn away by the said plows in case the soil should be caked or hard. The draft-strain upon the colters P is sustained by braces Q, attached to them and to the plow-beams N.

To the rear parts of the plow-beams N are attached the lower ends of the side bars of an upright frame, R, to the center of the cross-bar of which is attached the rear bearing for the shaft I, which is adjusted by means of slots in the side bars of the upright frame R for regulating the depth of the knives in the soil. The upper ends of the side bars of the frame R are attached to the round S, that connects the rear parts of the handles T. The forward ends of the handles T are attached to the upper side of the bearings M upon the opposite sides of the shaft I, as shown in Figs. 1, 2, 4, and 5.

With this construction the machine can be readily guided and controlled, even if the horse should not walk in the center of the space between the rows.

Having thus fully described my invention, I claim as new and desire to secure by Letters Patent—

1. In a cotton-chopper, the combination, with the shaft I, the knives L, and the operating mechanism, of the bearing M, the beams N, secured to the lower side of the bearing, the uprights R, the round S, and the handles T, secured to the upper side of the said bearing, substantially as and for the purpose set forth.

2. In a cotton-chopper, the combination, with the frame and the gear-shaft G, of the chopper-shaft I, the swivel H, the bearing M, the beam N, the handles T, and the upright frame R S, substantially as and for the purpose set forth.

JOSIAH L. HUGHES.

Witnesses:
W. D. SMITH,
JOHN DAVIS.